US012772362B2

(12) United States Patent
Jiang et al.

(10) Patent No.: US 12,772,362 B2
(45) Date of Patent: Oct. 20, 2026

(54) CONTROL CIRCUIT WITH SLOW-START SWITCH AND STAGE LIGHT FIXTURE HAVING SAME

(71) Applicant: GUANGZHOU HAOYANG ELECTRONIC CO., LTD., Guangdong (CN)

(72) Inventors: Weikai Jiang, Guangdong (CN); Hui Luo, Guangdong (CN); Li Bin, Guangdong (CN); Wenfeng Chen, Guangdong (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 94 days.

(21) Appl. No.: 19/006,412

(22) Filed: Dec. 31, 2024

(65) Prior Publication Data

US 2026/0156735 A1 Jun. 4, 2026

(30) Foreign Application Priority Data

Nov. 30, 2024 (CN) ......................... 202411751443.4

(51) Int. Cl.

| | |
|---|---|
| ***H05B 47/20*** | (2020.01) |
| ***F21V 21/26*** | (2006.01) |
| ***F21W 131/406*** | (2006.01) |
| ***H05B 45/20*** | (2020.01) |
| ***H05B 47/175*** | (2020.01) |
| ***H05B 47/19*** | (2020.01) |

(52) U.S. Cl.

CPC ............. *H05B 47/20* (2020.01); *F21V 21/26* (2013.01); *F21W 2131/406* (2013.01)

(58) Field of Classification Search

CPC ...... H05B 47/19; H05B 47/175; H05B 45/20; H05B 47/199; H05B 47/1965; H05B 47/105; H05B 47/11; H05B 47/1985; H05B 47/155; H05B 45/24; H05B 47/115

See application file for complete search history.

(56) References Cited

U.S. PATENT DOCUMENTS

| | | | | |
|---|---|---|---|---|
| 2018/0014376 | A1* | 1/2018 | Park ......................... | B60Q 1/30 |
| 2018/0338364 | A1* | 11/2018 | Ido ......................... | H05B 45/10 |
| 2024/0334566 | A1* | 10/2024 | Archer .................. | H05B 45/10 |

* cited by examiner

*Primary Examiner* — Wei (Victor) Y Chan

(74) *Attorney, Agent, or Firm* — MUNCY, GEISSLER, OLDS & LOWE, P.C.

(57) ABSTRACT

A control circuit with a slow-start switch includes a power supply, a post-stage load and an MCU for outputting a control voltage for activating the control circuit. The power supply is a constant-voltage power supply and is controllably coupled to the post-stage load through a delay switch and a current limiting module. The delay switch is a normally-open switch. The current limiting module is configured to be enabled when the control voltage is outputted by the MCU under power-on of the power supply and to be automatically disabled when the delay switch is turned on. A limiting current I3 of the current limiting module to the post-stage load is less than or equal to a minimum value of an anti-surge current I1 of the power supply and an anti-surge current I2 of the delay switch.

15 Claims, 7 Drawing Sheets

CONTROL CIRCUIT WITH SLOW-START SWITCH AND STAGE LIGHT FIXTURE HAVING SAME

CROSS REFERENCE TO RELATED APPLICATIONS

The present application claims priority from Chinese Application No. CN 202411751443.4 filed on Nov. 30, 2024, all of which are hereby incorporated herein by reference.

TECHNICAL FIELD

The present invention relates to the technical field of lighting devices, and in particular to a control circuit with a slow-start switch and a stage light fixture having the same.

BACKGROUND

In the era with rapid technology development, stage light fixtures have become complex lighting devices that integrate multiple lighting effects. The light fixture usually includes multiple modules, mainly including a light source module for generating light beams and an effect module for intercepting the light beams to form specific light spots. In order to ensure stability of the light fixture during operation, the control circuit usually provides a bypass capacitor or a decoupling capacitor to filter noise in the circuit. However, due to capacitive characteristics of the capacitor, a large surge current will be generated at the instant of power-on, which may lead to overload protection. In addition, many light fixtures have equipped with auxiliary protection systems. With such auxiliary protection systems, when working abnormal, the light fixture will be turned off in time and restarted after removal of a fault, which would greatly shorten service lives of a power supply, a post-stage load and the like in the circuit due to surge current generated, especially in the situation that the light fixture is activated frequently, or even be damaged directly, thus seriously affecting stability of the light fixtures.

In order to solve the problem of the surge current, a method of connecting a resistor in series in the circuit is mostly adopted in the market at present, so as to reduce the current that reaches the post-stage load at the instant of power-on. However, due to large load power of the stage light fixture, especially the light source module, the series resistor is prone to generate a lot of heat in long-term use, which is possible to be burned out, thus resulting in failure in normal operation of the whole circuit. In addition, another way is to reduce the capacity of the bypass capacitor or the decoupling capacitor in the subsequent load circuit. However, many modules are contained in the light fixture, it is thus difficult to significantly reduce the capacity of the bypass capacitor and the decoupling capacitor, resulting in unobvious protection effect.

Therefore, the related art has some limitations in solving the problems of the circuit stability and the surge current for the stage light fixtures. There is thus an urgent need for starting the light fixtures efficiently and safely. It is therefore desirable to provide a protection circuit that can allow the stage light fixtures to start stably.

SUMMARY

The present invention seeks to provide a solution to the before-mentioned problems and offers additional benefits to the existing prior art, which will become apparent in the following description. A control circuit with a slow-start switch and a stage light fixture having the same are provided according to the present invention, which are free from the problems of overload of the post-stage load or the switch in the circuit caused by the surge current existing in the control circuit at the instant of power-on, and enable the post-stage load or the switch to be activated stably and safely by using a slow-start function.

One aspect of the present invention provides a control circuit with a slow-start switch, which includes a power supply, a post-stage load and an MCU (Microcontroller Unit) for outputting a control voltage for activating the control circuit. The power supply is a constant-voltage power supply, the power supply is controllably coupled to the post-stage load through one of a delay switch and a current limiting module. The delay switch is a normally-open switch. The current limiting module is configured to be enabled when the control voltage is outputted by the MCU under power-on of the power supply and to be automatically disabled when the delay switch is turned on. A limiting current I3 of the current limiting module to the post-stage load is less than or equal to a minimum value of an anti-surge current I1 of the power supply and an anti-surge current I2 of the delay switch.

According to the present invention, when the control circuit starts to operate, the power supply provides a constant voltage, and the limiting current I3 is firstly provided for the post-stage load through the activated current limiting module. As the limiting current I3 is limited within a safe range, the surge current at starting can be effectively suppressed, so that the post-stage load can be started safely and stably. The delay switch in the present invention is set to delay turn-on relative to the current limiting module. In the case that the current limiting module is automatically disabled and no longer supplying power when the delay switch is turned on, activation of the control circuit is completed, and the power supply then continuously supplies power to the post-stage load through the delay switch.

Compared with the method of directly connecting a resistor in series with the control circuit to reduce the surge current in the prior art, the current limiting module in the present invention only operates at the beginning of enabling and then is automatically disabled, namely it only works for a short time, and thus does not consume extra power at normal power supply of the circuit, which is beneficial to reducing the overall power consumption of the system, thereby avoiding heat generated during long-term operation of the current limiting module, as well as optimizing heat management of the circuit. In addition, the present invention also effectively protects the delay switch and the power supply from triggering overload protection caused by surge current, thereby prolonging service lives of the delay switch and the power supply, also service life of the circuit.

According to a preferable embodiment of the present invention, the delay switch may specifically include a second switch K2 coupled the power supply to the post-stage load and a delay control module for controlling the second switch K2 to delay turn-on relative to the current limiting module, with an input terminal of the delay control module coupled to the MCU, and an output of the delay control module is coupled to the second switch K2. In such configuration, when the second switch K2 is turned on, the power supply can continuously supply power to the post-stage load. Moreover, with this arrangement, the current limiting module and the delay control module can operate at the same time, so as to achieve the purpose of controlling the second switch K2 to delay turn-on relative to the current limiting module, and improve the safe start-up performance of the control circuit with high accuracy.

Furthermore, the delay control module may particularly include a delay capacitor C1, and the delay control module is configured to control the second switch K2 to be turned on when the delay capacitor C1 is charged by the MCU to a preset voltage. This way uses the characteristics of the capacitor to achieve delay function, which has advantages of simple structure and easy to maintain.

In particular, the delay control module may further include a triode Q4, a field effect transistor Q3, a resistor R6, a resistor R7, a resistor R8 and a resistor R9. Specifically, the MCU is coupled to an anode of the delay capacitor C1 through the resistor R6, a cathode of the delay capacitor C1 is coupled to an emitter electrode E of the triode Q4, the resistor R8 is coupled to the anode of the delay capacitor C1 and a base electrode B of the triode Q4, the resistor R9 is coupled to the base electrode B and the emitter electrode E of the triode Q4, a collector electrode C of the triode Q4 is coupled to a gate electrode G of the field effect transistor Q3 through the resistor R7, the MCU is coupled to a source electrode S of the field effect transistor Q3, and a drain D of the field effect transistor Q3 is coupled to the second switch K2.

With such configuration, when the delay control module is activated, the MCU outputs a voltage VDD to charge the delay capacitor C1, until the delay capacitor C1 reaches a turn-on voltage drop value of the triode Q4, the triode Q4 is enabled, and the field effect transistor Q3 is also enabled. The voltage VDD outputted by the MCU is converted into VDD1 after flowing through the field effect transistor Q3, and then the second switch K2 is turned on and the current limiting module is accordingly disabled. The power supply continuously supplies power to the post-stage load through the delay circuit. Time delayed of the delay circuit in the present invention mainly depends on the delay capacitor C1, while which can also be changed by adjusting resistance values of the resistor R6 and the resistor R8.

Preferably, the second switch K2 may be a relay or a field effect transistor. In a case that the post-stage load needs a large current value to operate, the second switch K2 is particularly a relay. While the field effect transistor has good linearity and high stability.

The present invention can realize smooth transition from a current-limiting mode to a normal operating mode and prevent the system from generating a transient surge current. For the purpose of this, the control circuit in the present invention may further include a switch K3 for controlling the current limiting module to be enabled and disabled, the switch K3 is configured to disconnect the current limiting module from the MCU for outputting the control voltage when the delay switch is turned on, so that the current limiting module is disabled to disconnect an electrical connection between the power supply and the post-stage load. Therefore, the current limiting module in the present invention is controlled to be enabled and disabled only through a hardware structure logic of the circuit, which is simple in structure while with high accuracy.

The relay has advantages of high sensitivity and bearing a higher burst current at the contact thereof, which is not easy to be damaged and thus can achieve good reliability. Therefore, the switch K3 is particularly a relay according to a referable embodiment of the present invention, with a common end thereof coupled to the MCU, a coil end thereof coupled to the delay switch, and a normally-closed end thereof coupled to the current limiting module. In this way, when the common end of the switch K3 receives the control voltage sent by the MCU and the coil end of the switch is not activated, the switch K3 enables the current limiting module, so that the power supply supplies power to the post-stage load to generate a limiting current I3 through the current limiting module.

In addition, the current limiting module may preferably include a first switch and a current limiting resistor which are disposed in series between the power supply and the post-stage load, and the first switch is configured to be automatically turned off when the delay switch is turned on. The current limiting resistor in the present invention is used to divide the voltage and thus reduce current value output, so that the limiting current I3 outputted by the current limiting module is within the safe range. In such easy way, the circuit is simple in structure and easy to implement.

As a thermistor has high sensitivity and can dynamically change its resistance value with the service environment, the current limiting resistor in the present invention is preferably in form of a thermistor. Specifically, a positive temperature coefficient thermistor (PTC) or negative temperature coefficient thermistor (NTC) can be selected according to the actual design requirements.

The field effect transistor has low power consumption, fast switching speed and no mechanical wear, and can realize a silent operation. Therefore, the first switch K1 in the present invention may preferably include a field effect transistor connected between the power supply and the post-stage load, and a first control module for controlling the field effect transistor to be enabled and disabled, and the first control module is controllably coupled to the control voltage.

Furthermore, the first control module particularly includes a triode Q2, a resistor R2, a resistor R3 and a resistor R4. Specifically, a source electrode S of the field effect transistor is coupled to the power supply, a drain D of the field effect transistor is coupled to the post-stage load, and a gate electrode G of the field effect transistor is coupled to a collector electrode C of the triode Q2 through the resistor R2; a base electrode B of the triode Q2 is controllably coupled to the MCU for generating the control voltage in enabling and disabling manner through the resistor R4, an emitter electrode E of the triode is grounded, and the resistor R3 is connected to the base electrode B and the emitter electrode E of the triode Q2. In this case, when the base electrode B of the triode Q2 receives the control voltage from the MCU, the triode Q2 is activated and controls the field effect transistor to be enabled, so that the power supply supplies power to the post-stage load through the current limiting module. Conversely, when the triode Q2 is disconnected to the MCU, namely the first switch K1 is disabled, the current limiting module is no longer activated.

Alternatively, in order to further simplify the circuit structure and achieve good stability, the first switch K1 is designed in form of a relay, with a coil end thereof controllably coupled to the MCU for generating the control voltage in enabling and disabling manner, and two ends of an on-off switch thereof are respectively coupled to the power supply and the post-stage load. With the first switch K1 designed to be a relay, it can be directly connected to the MCU, and thus there is no need to set up an additional control module to control the first switch to be enabled and disabled.

Another aspect of the present invention provides a stage light fixture, which includes a light head for projecting a light beam and the control circuit in any case descried above. A light source for generating the light beam is mounted in the light head, and the post-stage load of the control circuit includes a driving circuit of the light source.

It is well known that with regard to the light source having relatively high power, the driving circuit of the light source generally generates a relatively large surge current at the instant of starting to operate. While with the current limiting module provided for the light source, the surge current can be effectively reduced, thus ensuring safe driving of the light source.

The stage light fixture may further include a supporting arm pivoted to the light head and a base pivoted to the supporting arm, so that the light head is capable of rotating around at least two dimensions relative to the base, and the post-stage load of the control circuit in this case includes a driving circuit for driving the light head and/or the supporting arm to rotate.

With such configuration, vertical scanning is realized by rotating the light head relative to the supporting arm, and horizontal scanning is realized by driving the light head to rotate relative to the base by the supporting arm. The rotation of the light head or the supporting arm usually requires a high-power motor, it is thus necessary to provide the control circuit to prevent the motor from being damaged by the surge current, thereby further ensuring the scanning accuracy of the stage light fixture.

Furthermore, the stage light fixture may further include an effect module for intercepting light to generate a specific light effect. The post-stage load of the control circuit in this case includes a driving circuit for driving the effect module. With the control circuit, the driving circuit can be effectively protected from being damaged due to surge current on these electronic components at the instant of starting to operate, thus effectively ensuring the service life of the electronic components and accurate operation of the effect module.

Figure 1:
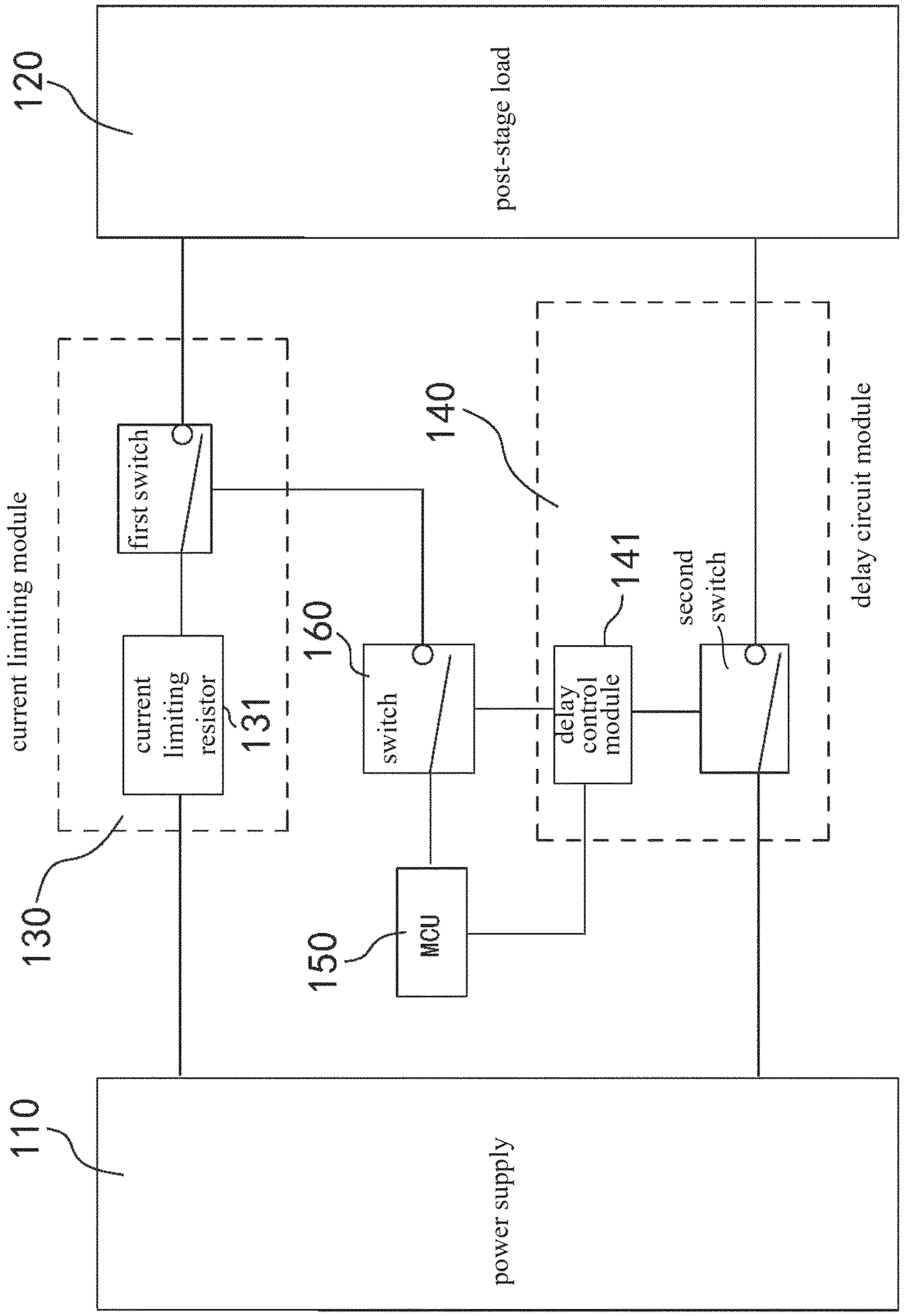
FIG. 1 is a schematic diagram of a control circuit with a slow-start switch according to an embodiment of the present invention.

Reference signs: 100 control circuit, 110 power supply, 120 post-stage load, 130 current limiting module, 131 current limiting resistor, 132 first control module, 140 delay switch, 141 delay control module, 150 MCU, 160 switch K3, 200 light head, 300 supporting arm, 400 base.

DETAILED DESCRIPTION

The drawings are for illustrative purposes only and are not to be construed as limiting the invention; for the purpose of better illustrating the present embodiments, certain components of the drawings may be omitted, enlarged or reduced, and do not represent the size of an actual product; and it will be understood by those skilled in the art that certain well-known structures in the drawings and descriptions thereof may be omitted. The positional relationships depicted in the drawings are for illustrative purposes only and are not to be construed as limiting the present invention.

FIG. 1 depicts a control circuit with a slow-start switch according to an embodiment of the present invention, which includes a power supply 110, a post-stage load 120 and an MCU 150 for outputting a control voltage for activating the control circuit 100. In this embodiment, the power supply 110 is a constant-voltage power supply, which is electrically connected with the post-stage load 120 through one of a delay switch 140 and a current limiting module 130. The delay switch 140 is a normally-open switch. The current limiting module 130 in this embodiment is configured to be enabled when the power supply 110 is powered on and the control voltage is outputted by the MCU 150 and to be automatically disabled when the delay switch 140 is turned on. The current limiting module 130 provides a limiting current I3 to the post-stage load 120, an anti-surge current of the power supply 110 is I1, and an anti-surge current of the delay switch 140 is I2. In this embodiment, the limiting current I3 is less than or equal to a minimum value of I1 and I2.

According to this embodiment, when the control circuit 100 starts to operate, the power supply 110 provides a constant voltage, and the limiting current I3 is provided for the post-stage load 120 by the current limiting module 130 that is enabled prior to the delay switch 140. In such configuration, as the limiting current I3 is limited within a safe range, the surge current at starting is effectively suppressed, so that the post-stage load 120 can be started safely and stably. The delay switch 140 is set to delay turn-on relative to the current limiting module 130. In addition, when the delay switch 140 is turned on, the current limiting module 130 is automatically disabled and no longer supplying power. The control circuit 100 is thus completed starting, namely the power supply 110 continuously supplies power to the post-stage load 120 through the delay switch 140.

Compared with a method of directly connecting a resistor in series with the control circuit 100 to reduce the surge current in the prior art, the current limiting module 130 in the present embodiment only operates at the beginning of enabling and then is automatically disabled, namely only works for a short time, which thus does not consume extra power at normal operation. Therefore, the present embodiment can reduce the overall power consumption of the system. In addition, the present embodiment can avoid heat generated by long-term operation of the current limiting module 130, thereby optimizing heat management of the circuit. Simultaneously, it also effectively protects the delay switch 140 and the power supply 110 from triggering overload protection due to surge current, thus prolonging service life thereof.

The MCU 150 in the present embodiment is preferably a control switch for the current limiting module 130 and the delay switch 140. That is, when the MCU 150 generates a control voltage, the current limiting module 130 and the delay switch 140 can be enabled, and when the MCU 150 stops generating the control voltage or emits a stop signal, the current limiting module and the delay switch are disabled.

The control voltage VDD emitted by the MCU 150 is preferably 5V.

The limiting current I3 is preferably less than the minimum value of I1 and I2.

Specifically, the delay switch 140 in this embodiment includes a second switch K2 coupled to the power supply 110 and the post-stage load 120 and a delay control module 141 for controlling the second switch K2 to delay turn-on relative to the current limiting module 130, with an input terminal of the delay control module 141 coupled to the MCU 150, and an output there coupled to the second switch K2. When the second switch K2 is turned on, the power supply 110 can continuously supply power to the post-stage load 120 through the delay circuit. With this arrangement, the current limiting module 130 and the delay control module 141 can operate at the same time, so as to achieve the purpose of controlling the second switch K2 to delay turn-on relative to the current limiting module 130, and thus improve safe start-up performance of the control circuit 100 with high accuracy.

Figure 3:
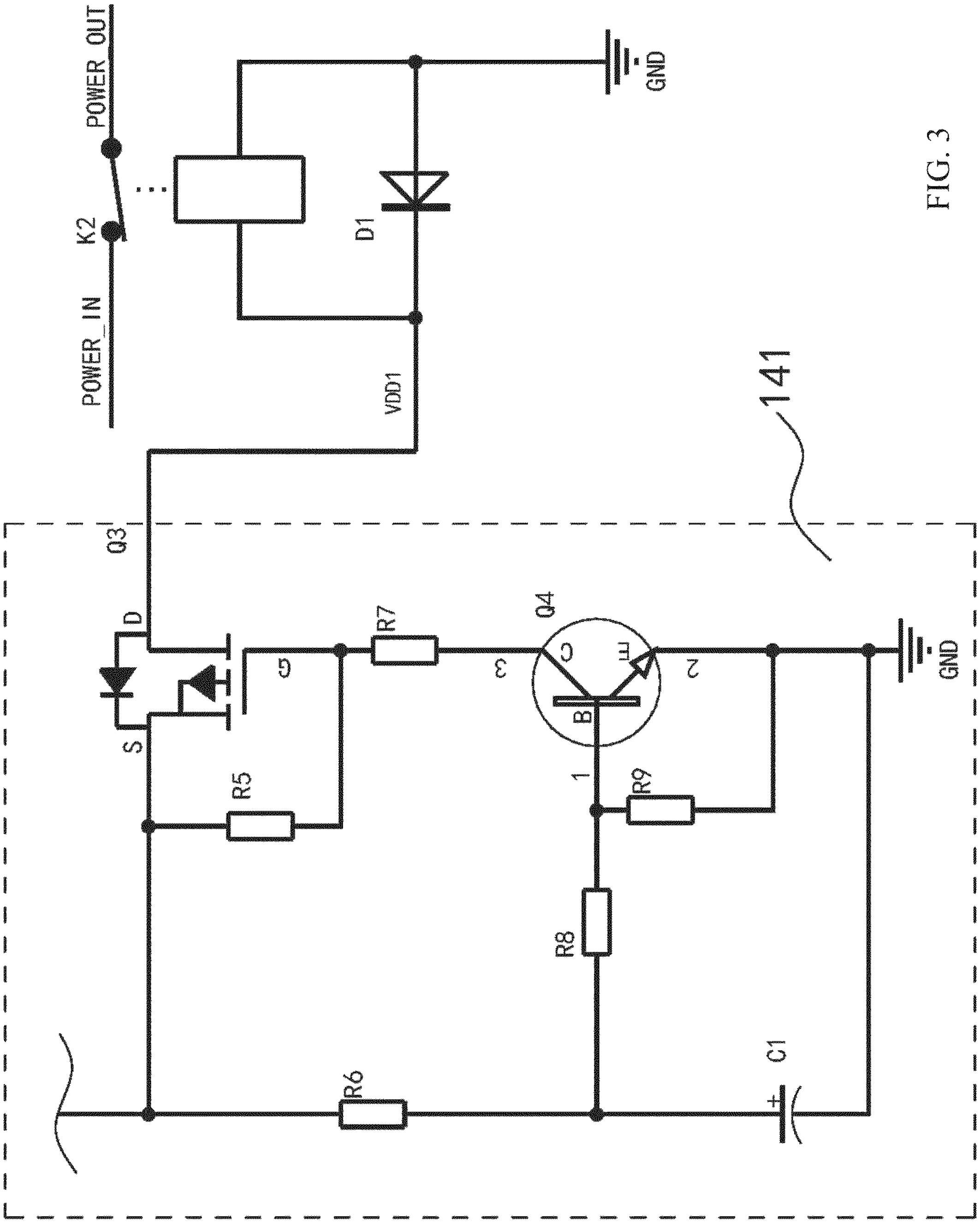
FIG. 3 is a schematic diagram of a circuit of a delay switch according to an embodiment of the present invention, in which a second switch is a relay.

Referring to FIG. 3, according to a preferred embodiment of the present invention, the delay control module 141 includes a delay capacitor C1. The delay control module 141 in this embodiment is configured to control the second switch K2 to be turned on when the MCU 150 charges the delay capacitor C1 to a preset voltage. In this embodiment, the delay is achieved by using the characteristics of the capacitor, which is simple in structure and easy to maintain.

The delay control module 141 further includes a triode Q4, a field effect transistor Q3, a resistor R6, a resistor R7, a resistor R8 and a resistor R9. Specifically, the MCU 150 is coupled to an anode of the delay capacitor C1 through the resistor R6, a cathode of the delay capacitor C1 is coupled to an emitter electrode E of the triode Q4, the resistor R8 is coupled to the anode of the delay capacitor C1 and a base electrode B of the triode Q4, the resistor R9 is coupled to the base electrode B and the emitter electrode E of the triode Q4, a collector electrode C of the triode Q4 is coupled to a gate electrode G of the field effect transistor Q3 through the resistor R7, the MCU 150 is further coupled to a source electrode S of the field effect transistor Q3, and a drain D of the field effect transistor Q3 is coupled to the second switch K2.

In this configuration of the delay control module 141, when the delay control module 141 is activated, the MCU 150 outputs a voltage VDD to charge the delay capacitor C1, until the delay capacitor C1 reaches a turn-on voltage drop value of the triode Q4, the triode Q4 is enabled, and the field effect transistor Q3 is also enabled. The voltage VDD outputted by the MCU 150 is converted into VDD1 after flowing through the field effect transistor Q3, and then the second switch K2 is turned on and the current limiting module 130 is accordingly disabled. The power supply 110 then continuously supplies power to the post-stage load 120 through the delay switch 140. Time delayed by such delay circuit mainly depends on the delay capacitor C1, however which can also be changed by adjusting resistance of the resistor R6 and the resistor R8.

The delay control module 141 may further include a limiting resistor R5, with two ends thereof are coupled to the source electrode S and the gate electrode G of the field effect transistor Q3 respectively.

The control circuit may further include a switch K3 160 to controlling enable and disable the current limiting module 130. The K3 160 is preferably a relay. When the delay switch 140 is turned on, the switch K3 160 disconnects the current limiting module 130 from the MCU 150, so that the current limiting module 130 disconnects the connection between the power supply 110 and the post-stage load 120.

Preferably, the control voltage of the MCU 150 is VDD, and a turn-on voltage drop of the triode Q4 is Vbe (when the triode Q4 is replaced by an MOS transistor, its turn-on voltage drop is Vgs), a turn-on current I4 of the triode Q4 is accordingly equal to (VDD−Vbe)/(R6+R8). Therefore, if a charging current of the delay capacitor C1 is I4, the time required for the delay capacitor C1 to reach the turn-on voltage drop value Vbe of the triode Q4 is t1=−R*C1*ln (1−Vbe/VDD), where R is a sum of the resistance values of the resistor R6 and the resistor R8, C1 is a capacitance value of the delay capacitor C1, and ln refers to the logarithmic function. That is, the delay time of the delay switch 140 relative to the current limiting module 130 is greater than or equal to t1.

Accordingly, an appropriate delay duration can be set by adjusting the resistance of the resistor R6, the resistance of the resistor R8, or the capacitance of the delay capacitor C1.

According to other embodiments, the triode Q4 is replaced by the MOS transistor; similarly, the turn-on of the second switch K2 can be delayed in cooperation with the delay capacitor C1 and the field effect transistor Q3, with other circuit structures of the delay control module 141 adjusted adaptively.

The second switch K2 may be a relay or a field effect transistor. In a case that the post-stage load 120 needs a large current to operate, the second switch K2 is preferably a relay. While the field effect transistor has good linearity and high stability.

The second switch K2 in the delay control module 141 shown in FIG. 3 is a relay. The coil end of the second switch K2 is connected in parallel with a protection diode D1.

Referring back to FIG. 1, the control circuit in this embodiment further includes a switch K3 160 to controlling the current limiting module 130 to be enabled and disabled according to a preferable embodiment. When the delay switch 140 is turned on, the switch K3 160 disconnects the current limiting module 130 from the MCU 150, so that the current limiting module 130 disconnects the connection between the power supply 110 and the post-stage load 120. With the switch K3 160, it can realize smooth transition from a current-limiting mode to a normal operating mode, thus preventing the system from generating a transient surge current. In such way, the current limiting module 130 is controlled to be enabled and disabled only through a hardware structure logic of the circuit, which is simple in structure while with high accuracy.

Figure 4:
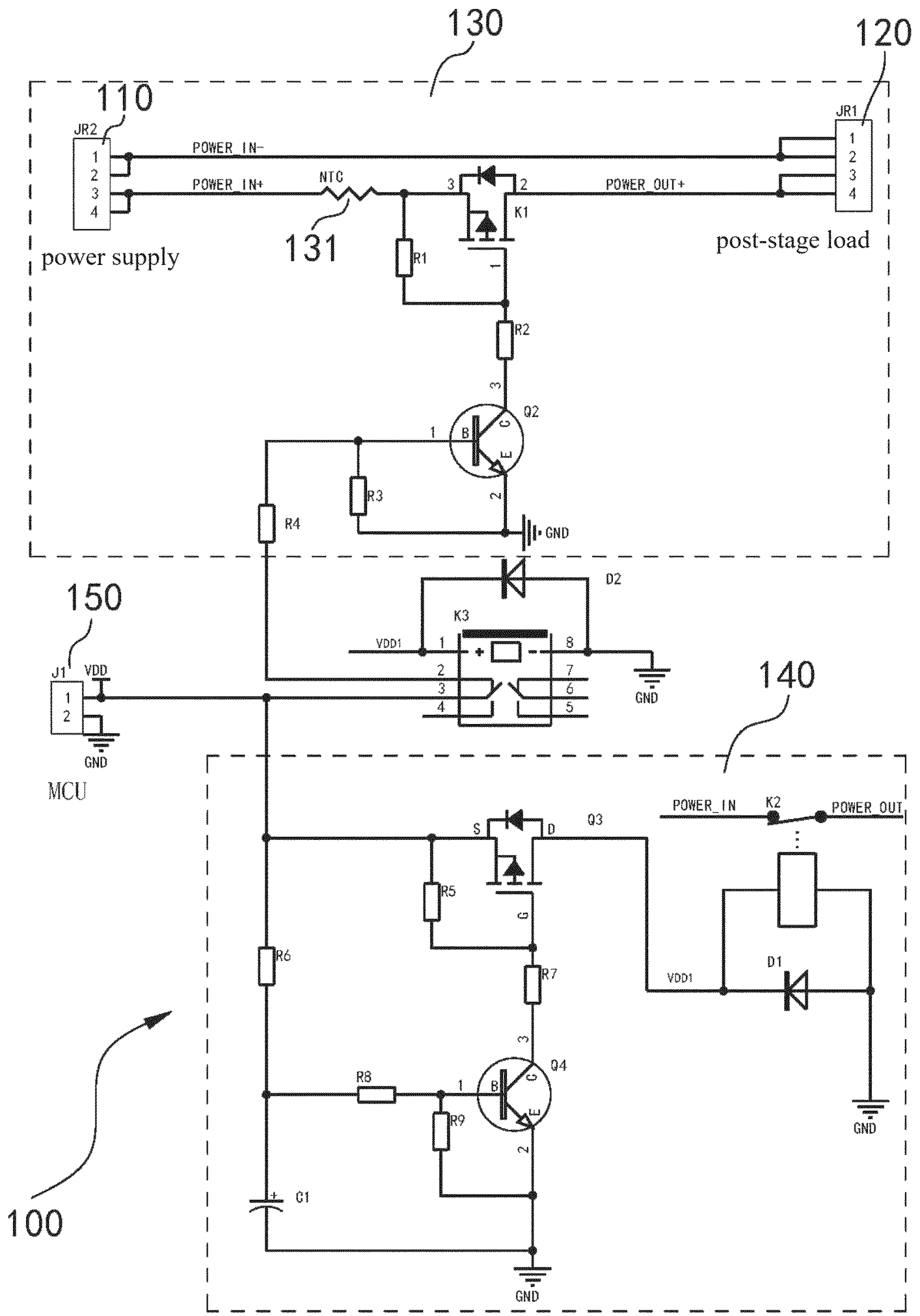
FIG. 4 is a schematic diagram of a control circuit with the first switch being a field effect transistor, according to an embodiment of the present invention.
Figure 5:
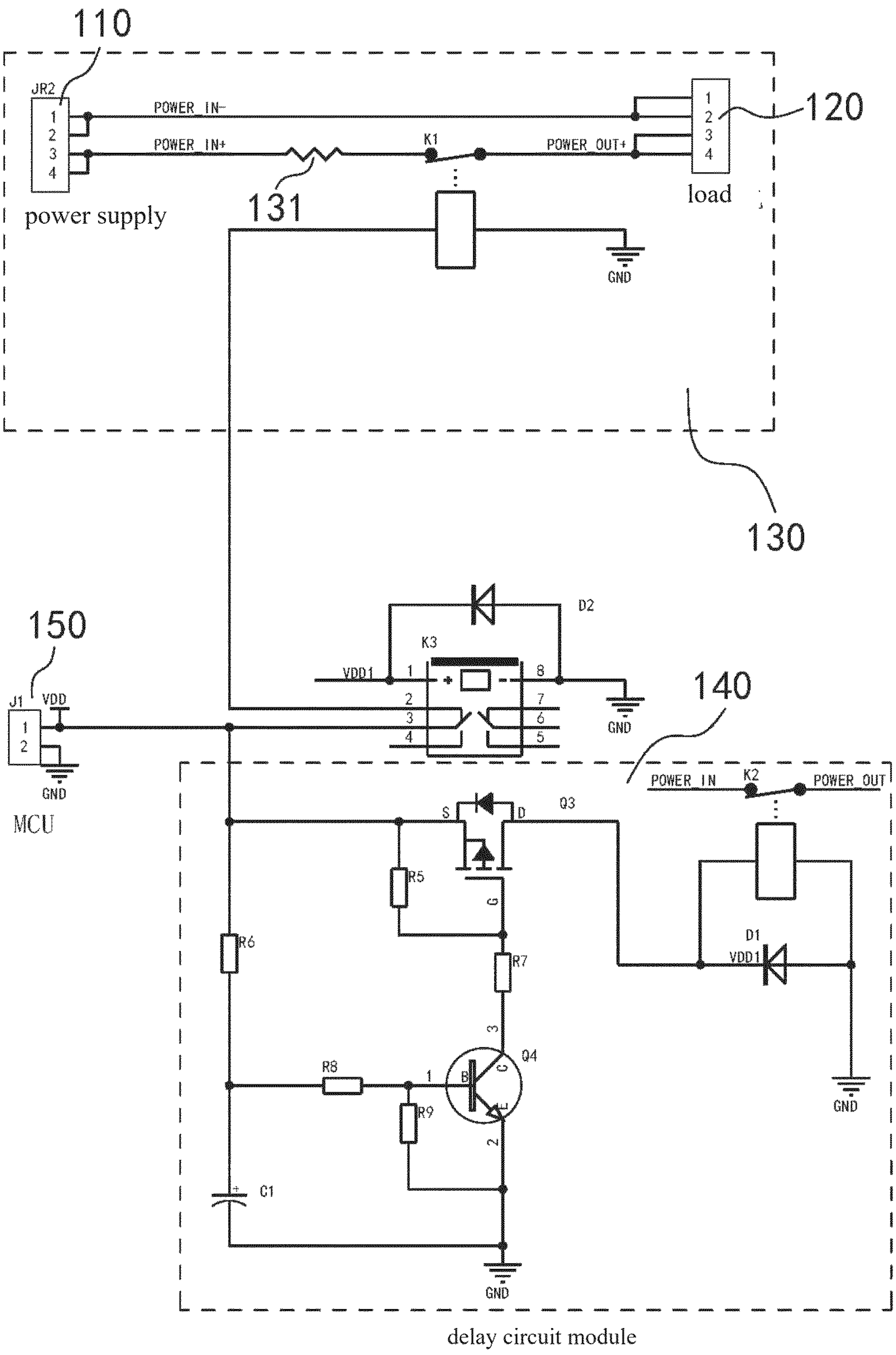
FIG. 5 is a schematic diagram of a control circuit with the first switch being a relay, according to an embodiment of the present invention.

Referring to FIG. 4 and FIG. 5, the switch K3 160 is a relay, with a common end thereof coupled to the MCU 150, a coil end thereof coupled to the delay switch 140, and a normally-closed end thereof coupled to the current limiting module 130. When the common end of the switch K3 160 receives the control voltage sent by the MCU 150 and the coil end of the switch is inactivated, the switch K3 160 enables the current limiting module 130, so that the power supply 110 supplies power to the post-stage load 120 through the current limiting module 130 to generate a limiting current I3. The relay has high sensitivity and the contact of the relay can bear a higher burst current, which is thus not easy to be damaged, achieving good reliability.

In this embodiment, as shown in FIG. 4 and FIG. 5, the coil end of the switch K3 160 corresponds to the pin 1, the normally-closed end of the switch corresponds to the pin 2, and the common end of the switch corresponds to the pin 3.

The delay switch 140 in this embodiment includes a field effect transistor Q3 and a second switch K2. The control voltage VDD from the MCU 150 is converted into VDD1 through the field effect transistor Q3, and the converted control voltage VDD1 turns on the second switch K2, namely the delay switch 140 is turned on. Simultaneously the field effect transistor Q3 inputs the converted control voltage VDD1 to the coil end (pin 1) of the switch K3 160, so that the normally-closed end is disconnected, the current limiting module 130 is accordingly inactivated.

Referring back to FIG. 1, according to a preferred embodiment of the present invention, the current limiting module 130 includes a first switch and a current limiting resistor 131 which are disposed in series between the power supply 110 and the post-stage load 120. The first switch is automatically disabled when the delay switch 140 is enabled. The current limiting resistor 131 is used to divide the voltage and thus reduce current value output, so that the limiting current I3 outputted by the current limiting module 130 is within the safe range. The circuit in such configuration is simple in structure and easy to implement.

The current limiting resistor 131 is preferably a thermistor, which has high sensitivity and can dynamically change its resistance with the environment. A positive temperature coefficient thermistor (PTC) or negative temperature coefficient thermistor (NTC) can be selected according to the actual design requirements.

The current limiting resistor 131 is preferably the negative temperature coefficient thermistor (NTC), whose resistance decreases with increase of the temperature. Therefore, in operation of the current limiting module 130, no larger resistance value is generated under too high temperature, so that the current will be gradually increased, contributing to slow-start of the control circuit 100.

Figure 2:
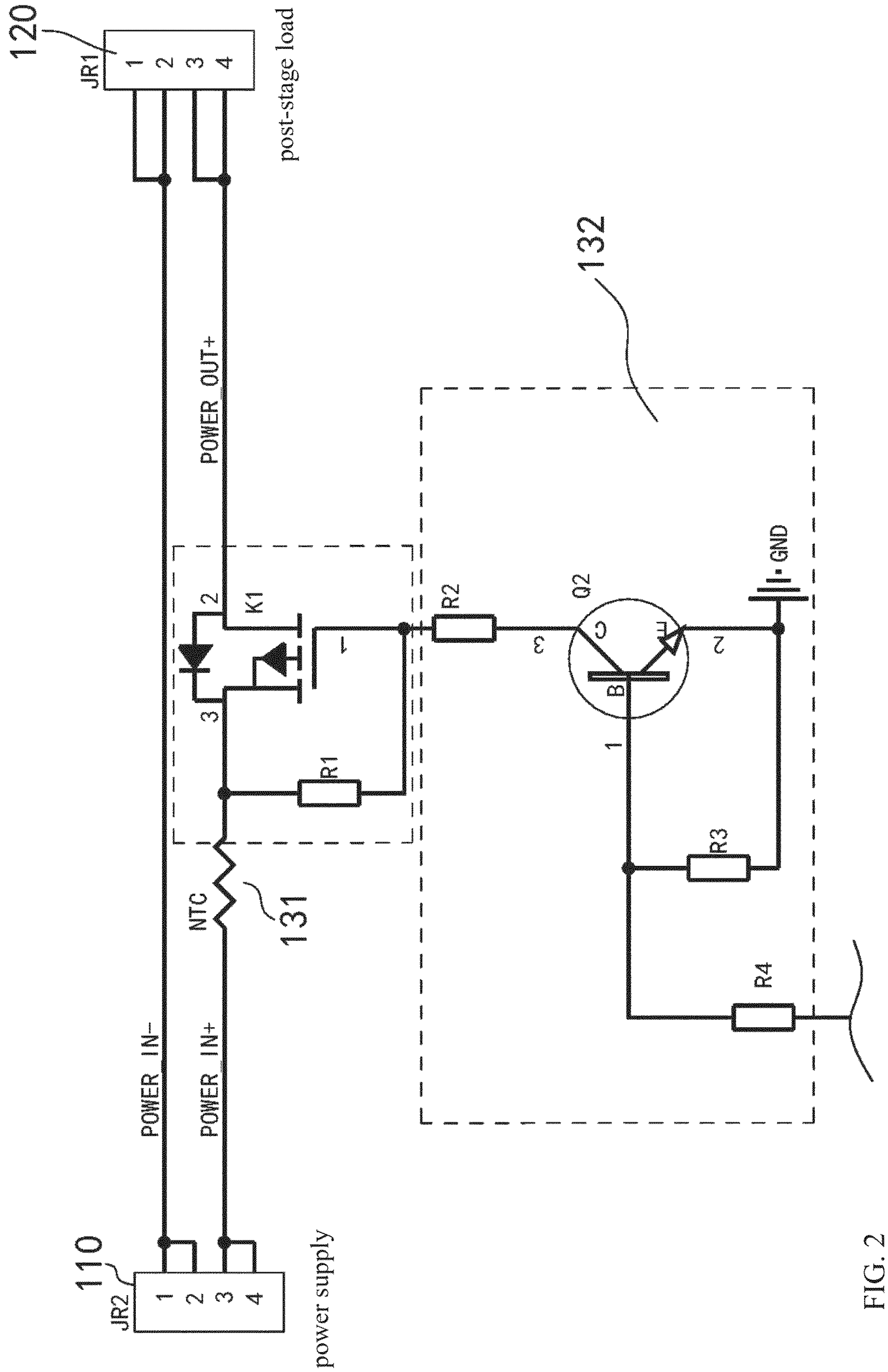
FIG. 2 is a schematic diagram of a circuit of a current limiting module according to an embodiment of the present invention, in which a first switch is a field effect transistor.

Now referring to FIG. 2, the first switch K1 particularly includes a field effect transistor connected between the power supply 110 and the post-stage load 120, and a first control module 132 for controllably enabling and disabling the field effect transistor. The first control module 132 is controllably coupled to the control voltage in enabling and disabling manner. The field effect transistor has low power consumption, fast switching speed and no mechanical wear, and can realize a silent operation.

FIG. 4 shows a control circuit with the first switch being the field effect transistor. In this embodiment, the current limiting module 130 is controllably enabled and disabled by the switch K3 160. Particularly, the first control module 132 is electrically connected to the normally-closed end of the switch K3 160.

As shown in FIG. 2, the first control module 132 includes a triode Q2, a resistor R2, a resistor R3 and a resistor R4. Specifically, a source electrode S of the field effect transistor is coupled to the power supply 110, a drain D of the field effect transistor is coupled to the post-stage load 120, and a gate electrode G of the field effect transistor is coupled to a collector electrode C of the triode Q2 through the resistor R2; a base electrode B of the triode Q2 is controllably coupled to the MCU 150 for generating the control voltage in enabling and disabling manner through the resistor R4, an emitter electrode E of the triode is grounded, and the resistor R3 is coupled to the base electrode B and the emitter electrode E of the triode Q2. When the base electrode B of the triode Q2 receives the MCU 150, the triode Q2 is activated and controls the field effect transistor to be enabled, so that the power supply 110 supplies power to the post-stage load 120 through the current limiting module 130. Conversely, when the triode Q2 is disconnected to the MCU 150, namely the first switch K1 is disabled, the current limiting module 130 is no longer activated.

The control circuit further includes a limiting resistor R1, with two ends thereof respectively coupled to the source electrode S and the drain D of the field effect transistor.

Alternatively, the triode Q2 can be replaced by the MOS transistor.

In an alternative embodiment, the first switch K1 is a relay. FIG. 5 shows a control circuit with the first switch being the relay. A coil end of the relay is controllably coupled to the MCU 150 for generating the control voltage in enabling and disabling manner, and the two ends of the relay are respectively coupled to the power supply 110 and the post-stage load 120. With the relay, the first switch can be directly connected to the MCU 150, thus there is no need to set up a control module to control the first switch to be enabled and disabled, which further simplifies the circuit structure and achieves good stability.

Figure 6:
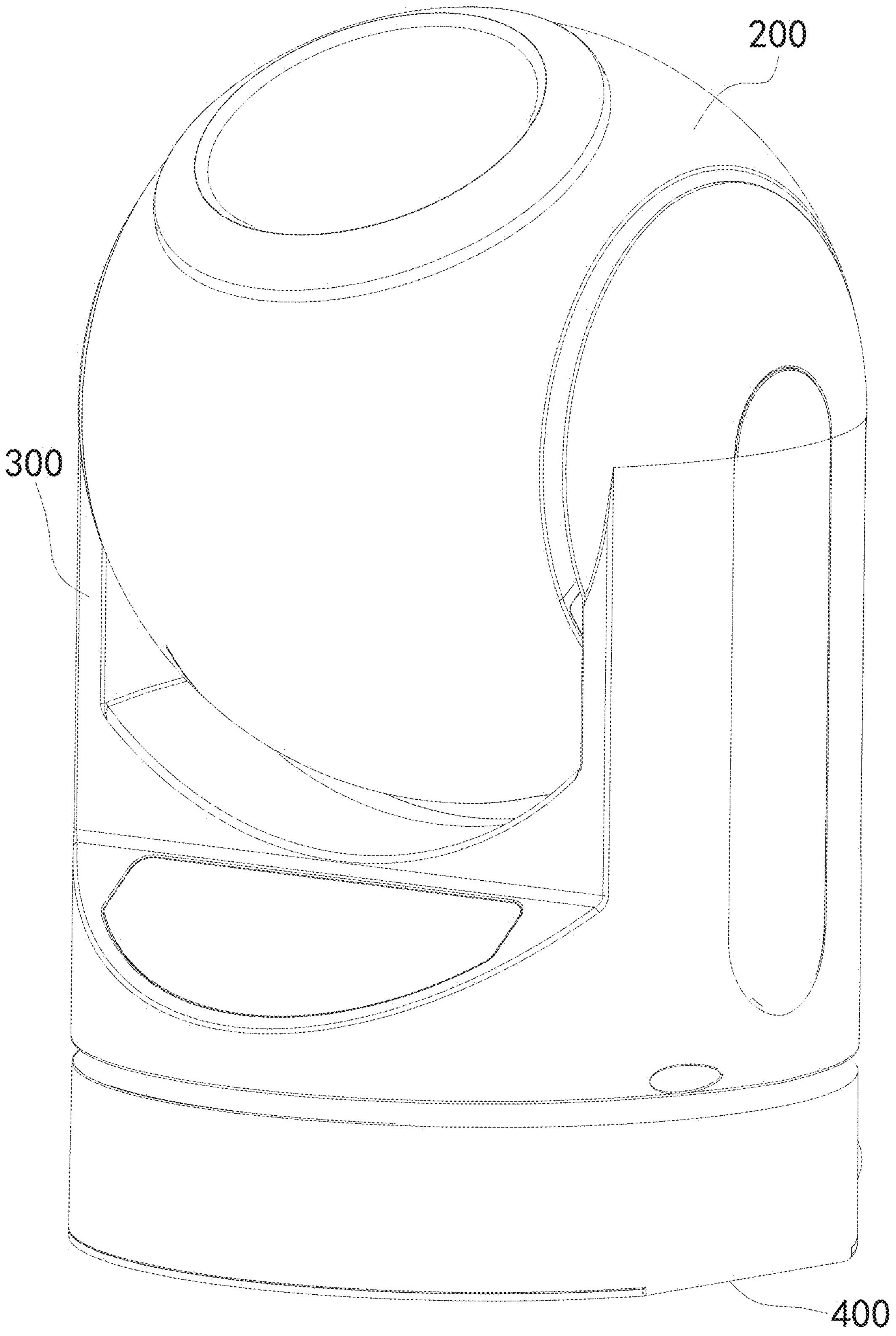
FIG. 6 is a structural schematic diagram of a stage light fixture equipped with a control circuit having a slow-start switch according to an embodiment of the present invention.
Figure 7:
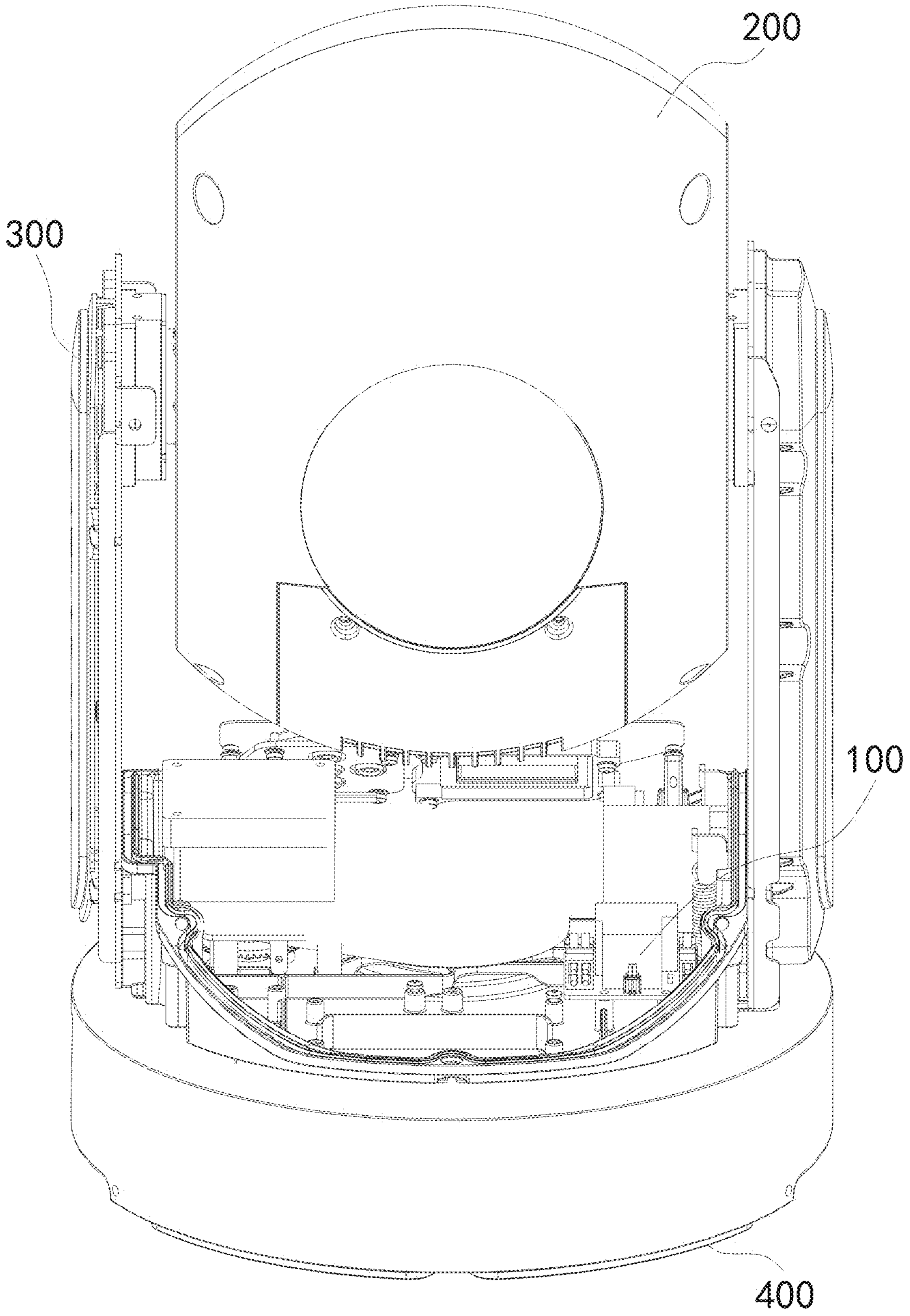
FIG. 7 is a structural schematic diagram showing the inside of the stage light fixture of FIG. 6.

FIG. 6 and FIG. 7 depict a stage light fixture, including a light head 200 for projecting a light beam. At least one control circuit 100 according to any case descried above is provided in the light fixture. The light source for generating the light beam is mounted in the light head 200, and the post-stage load 120 of the control circuit includes a driving circuit of the light source.

It is well known that with regard to the light source having relatively high power, the driving circuit of the light source generally generates a relatively large surge current at the instant of starting to operate. With the current limiting module 130 for the light source, the surge current is effectively reduced, thus ensuring safe driving of the light source.

The stage light fixture further includes a supporting arm 300 pivoted to the light head 200 and a base 400 pivoted to the supporting arm 300. The light fixture 200 with such configuration is capable of rotating around at least two dimensions relative to the base 400. The post-stage load 120 further of the control circuit 100 in this embodiment further includes a driving circuit for driving the light head 200 and/or the supporting arm 300 to rotate.

According to this embodiment, vertical scanning is realized by rotating the light head 200 relative to the supporting arm 300, and horizontal scanning is realized by driving the light head 200 to rotate relative to the base 400 by the supporting arm 300. The rotation of the light had 200 or the supporting arm 300 usually requires a high-power motor, it is thus necessary to provide the control circuit 100 to prevent the motor from being damaged by the surge current, thereby further ensuring scanning accuracy of the stage light fixture.

The power supply 110 of the control circuit 100 is preferably mounted inside the supporting arm 300 or inside the base 400.

In a preferred embodiment of the present invention, the stage light fixture further includes an effect module for intercepting light to generate specific light effects. The post-stage load 120 of the control circuit 100 in this embodiment further includes a driving circuit for driving the effect module. The driving circuit of the effect module usually drives a large number of motors and other electronic components. With the control circuit 100, the driving circuit is effectively protected from being damaged due to surge current on these electronic components at the instant of starting to operate, thus effectively ensuring the service life of the electronic components and accurate operation of the effect module.

It should be noted that the operating time of the current limiting module 130 is very short, almost within 1 second or even several milliseconds, so that audiences hardly notice the delay of light effects of the stage light fixture when immediately switching to a normal power supply mode form the current-limiting mode after the slow-start is completed. Therefore, the driving circuits can effectively cope with frequent multiple starts, such as due to power failure, thus ensuring stable operation of the stage light fixture.

For example, the operating current provided by the power supply 110 for the post-stage load 120 is 100 A, the limiting current I3 outputted by the current limiting module 130 is 5 A.

Obviously, the above-described embodiments of the present invention are merely examples for the purpose of clearly illustrating the present invention, and are not intended to limit the embodiments of the present invention. It will be apparent to one of ordinary skill in the art that various other modifications and variations can be made on the basis of the above description. It is not necessary and impossible to exhaust all the implementations here. Any modifications, equivalents and improvements made within the spirit and principles of the present invention should be included within the scope of protection of the claims of the present invention.

What is claimed is:

1. A control circuit with a slow-start switch, comprising:

a power supply, which is a constant-voltage power supply;

a post-stage load; and an MCU (Microcontroller Unit) for outputting a control voltage for activating the control circuit, wherein the power supply is controllably coupled to the post-stage load through one of a delay switch and a current limiting module, the delay switch is a normally-open switch; the current limiting module is configured to be enabled when the control voltage is outputted by the MCU under power-on of the power supply and to be automatically disabled when the delay switch is turned on; and a limiting current of the current limiting module to the post-stage load is less than or equal to a minimum value of an anti-surge current of the power supply and an anti-surge current of the delay switch.

2. The control circuit according to claim 1, wherein the delay switch comprises a second switch coupled the power supply to the post-stage load and a delay control module for controlling the second switch to delay turn-on relative to the current limiting module, with an input terminal of the delay control module coupled to the MCU, and an output terminal of the delay control module coupled to the second switch.

3. The control circuit according to claim 2, wherein the delay control module comprises a delay capacitor, and the delay control module is configured to control the second switch to be turned on when the delay capacitor is charged by the MCU to a preset voltage.

4. The control circuit according to claim 3, wherein the delay control module further comprises a triode Q4, a field effect transistor Q3, a resistor R6, a resistor R7, a resistor R8 and a resistor R9, wherein the MCU is coupled to an anode of the delay capacitor C1 through the resistor R6, a cathode of the delay capacitor C1 is coupled to an emitter electrode E of the triode Q4, the resistor R8 is coupled to the anode of the delay capacitor C1 and a base electrode B of the triode Q4, the resistor R9 is coupled to the base electrode B and the emitter electrode E of the triode Q4, a collector electrode C of the triode Q4 is coupled to a gate electrode G of the field effect transistor Q3 through the resistor R7, the MCU is coupled to a source electrode S of the field effect transistor Q3, and a drain D of the field effect transistor Q3 is coupled to the second switch.

5. The control circuit according to claim 2, wherein the second switch is in form of a relay or a field effect transistor.

6. The control circuit according to claim 1, further comprising a third switch for controlling the current limiting module to be enabled and disabled, which is configured to disconnect the current limiting module from the MCU for outputting the control voltage when the delay switch is turned on, such that the current limiting module is disabled to disconnect an electrical connection between the power supply and the post-stage load.

7. The control circuit according to claim 6, wherein the third switch is in form of a relay, with a common end thereof coupled to the MCU, a coil end thereof coupled to the delay switch, and a normally-closed end thereof coupled to the current limiting module.

8. The control circuit according to claim 1, wherein the current limiting module comprises a first switch and a current limiting resistor which are disposed in series between the power supply and the post-stage load, and the first switch is configured to be automatically turned off when the delay switch is turned on.

9. The control circuit according to claim 8, wherein the current limiting resistor is a thermistor.

10. The control circuit according to claim 8, wherein the first switch comprises a field effect transistor connected between the power supply and the post-stage load, and a first control module for controlling the field effect transistor to be enabled and disabled, and the first control module being controllably coupled to the control voltage.

11. The control circuit according to claim 10, wherein the first control module comprises a triode Q2, a resistor R2, a resistor R3 and a resistor R4, wherein a source electrode S of the field effect transistor is coupled to the power supply, a drain D of the field effect transistor is coupled to the post-stage load, and a gate electrode G of the field effect transistor is coupled to a collector electrode C of the triode Q2 through the resistor R2; a base electrode B of the triode Q2 is controllably coupled to the MCU for generating the control voltage in enabling and disabling manner through the resistor R4, an emitter electrode E of the triode Q2 is grounded, and the resistor R3 is coupled to the base electrode B and the emitter electrode E of the triode Q2.

12. The control circuit according to claim 8, wherein the first switch is a relay, a coil end of the relay is controllably coupled to the MCU for generating the control voltage in enabling and disabling manner, and two ends of an on-off switch of the relay are respectively coupled to the power supply and the post-stage load.

13. A stage light fixture, comprising a light head for projecting a light beam and at least one control circuit according to claim 1, wherein a light source for generating the light beam is mounted in the light head, and the post-stage load of the at least one control circuit further includes a driving circuit of the light source.

14. The stage light fixture according to claim 13, further comprising a supporting arm pivoted to the light head and a base pivoted to the supporting arm, so that the light head is capable of rotating around at least two dimensions relative to the base, and the post-stage load of the at least one control circuit includes a driving circuit for driving the light head and/or the supporting arm to rotate.

15. The stage light fixture according to claim 13, further comprising an effect module for intercepting light to generate a specific light effect, wherein the post-stage load of the at least one control circuit further includes a driving circuit for driving the effect module.

* * * * *